(12) United States Patent
Oh

(10) Patent No.: US 7,463,768 B2
(45) Date of Patent: Dec. 9, 2008

(54) GRAPHIC STORING AND RECONSTRUCTING METHOD FOR GRAPHICAL USER INTERFACE AND APPARATUS THEREFOR

(75) Inventor: Young-seuk Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1022 days.

(21) Appl. No.: 10/781,658

(22) Filed: Feb. 20, 2004

(65) Prior Publication Data

US 2004/0165770 A1  Aug. 26, 2004

(30) Foreign Application Priority Data

Feb. 21, 2003  (KR) ...................... 10-2003-0010974
Nov. 3, 2003  (KR) ...................... 10-2003-0077369

(51) Int. Cl.
*G06K 9/00* (2006.01)

(52) U.S. Cl. ..................... 382/164; 382/170; 382/232

(58) Field of Classification Search ................. 382/232, 382/233, 245, 246, 176, 156, 170, 164, 180; 348/587; 345/544, 501; 455/466; 400/61, 400/70, 76; 386/95, 125

See application file for complete search history.

(56) References Cited

U.S. PATENT DOCUMENTS 4,779,210 A * 10/1988 Katsura et al. .............. 345/501
5,748,904 A * 5/1998 Huang et al. ................ 345/544
5,872,864 A * 2/1999 Imade et al. ................ 382/176
5,971,633 A * 10/1999 Sano ........................... 400/76
6,597,406 B2 * 7/2003 Gloudemans et al. ....... 348/587
6,920,331 B1 * 7/2005 Sim et al. .................... 455/466

FOREIGN PATENT DOCUMENTS

JP  2001-045438  2/2001
JP  2001-169230  6/2001

OTHER PUBLICATIONS

Korean Office Action issued Feb. 23, 2005 in Korean Patent Application No. 10-2003-00010974 (with an English language translation thereof).

* cited by examiner

*Primary Examiner*—Anh Hong Do
(74) *Attorney, Agent, or Firm*—Staas & Halsey LLP

(57) ABSTRACT

There are provided a method and apparatus for storing and reconstructing a graphic for graphic user interface (GUI), capable of reducing a storage amount of a graphic and a loading time of a graphic. The graphic storing method includes: dividing the graphic into sub-graphics on the basis of color characteristic of the graphic; and storing configuration information of the sub-graphics. The graphic reconstructing method includes: determining sub-graphics required for reconstructing the graphic; reading configuration information of the determined sub-graphics and reconstructing the determined sub-graphics; and combining the reconstructed sub-graphic based on the configuration information and displaying the combined result.

47 Claims, 8 Drawing Sheets

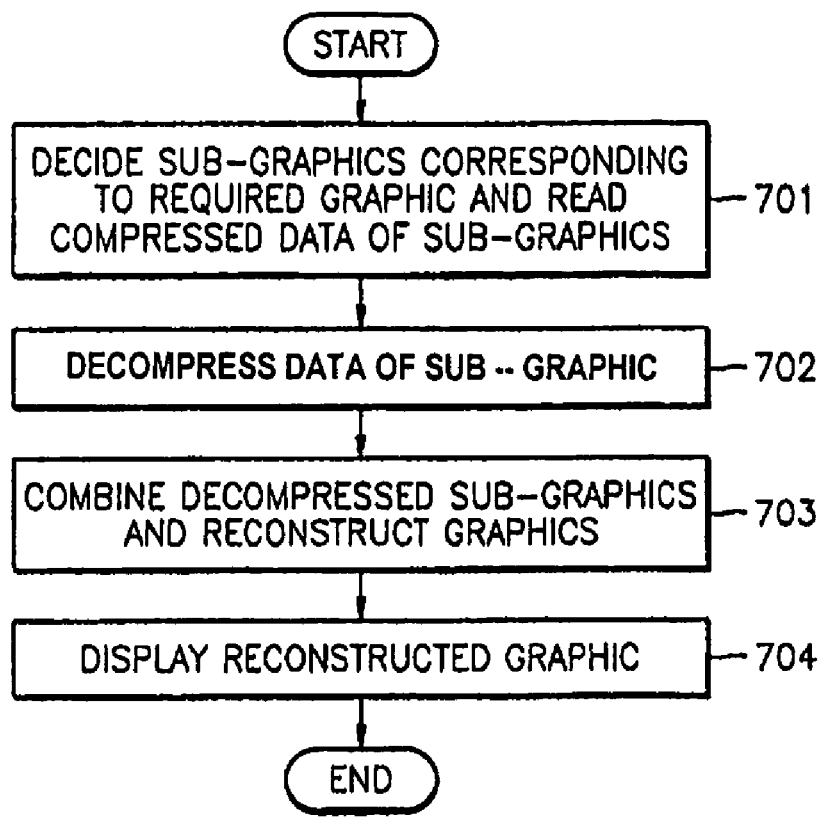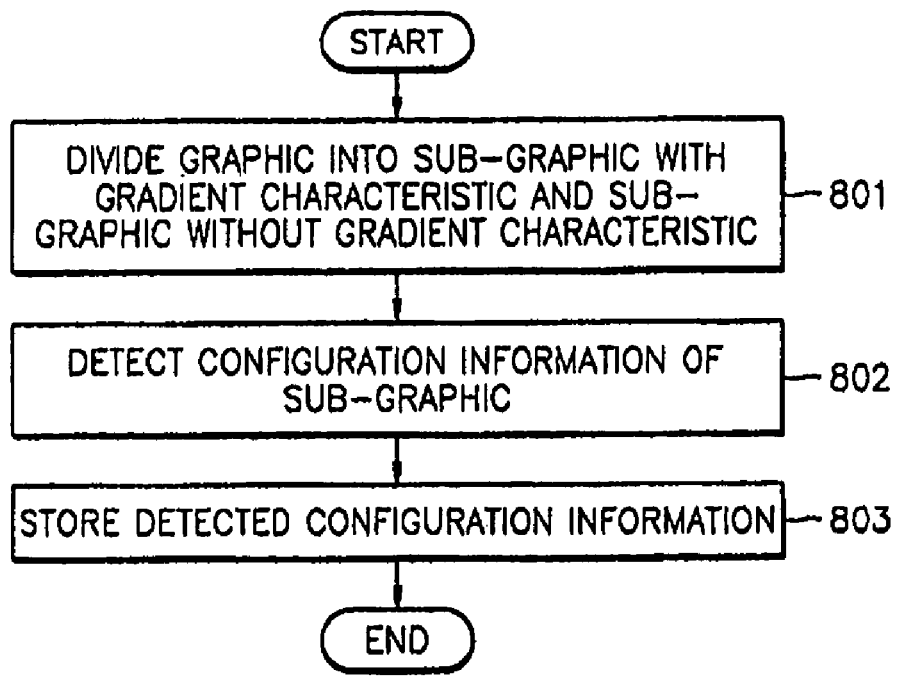

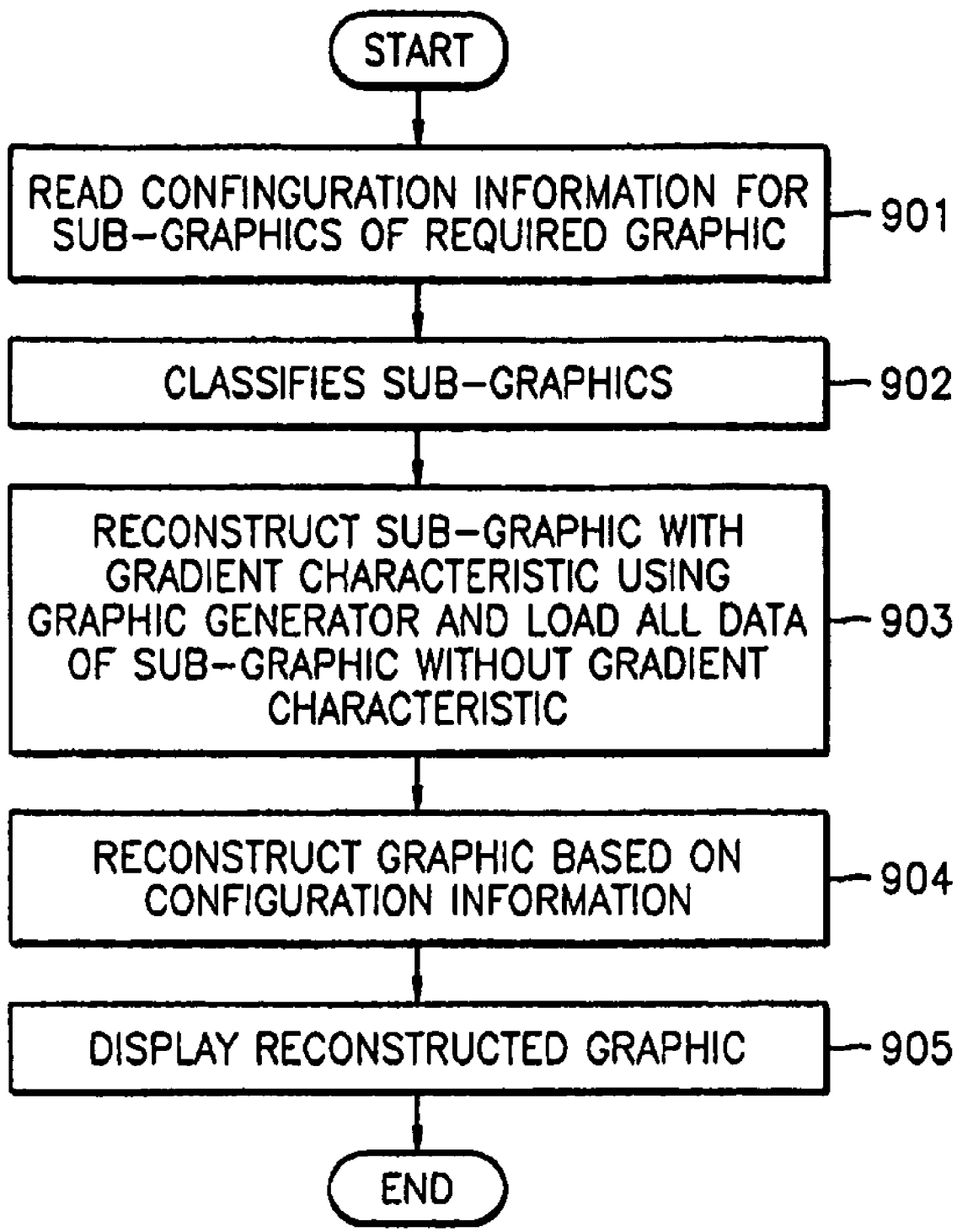

GRAPHIC STORING AND RECONSTRUCTING METHOD FOR GRAPHICAL USER INTERFACE AND APPARATUS THEREFOR

CROSS-REFERENCE TO RELATED APPLICATIONS

This application claims the benefit of Korean Patent Applications No. 2003-10974, filed on Feb. 21, 2003 and Korean Patent Application No. 2003-77369, filed on Nov. 3, 2003, in the Korean Intellectual Property Office, the disclosures of which are incorporated herein by reference.

BACKGROUND OF THE INVENTION

1. Field of the Invention

The present invention relates to a graphic storing and reconstructing method for a graphic user interface (GUI) and an apparatus therefor, and more particularly, to a graphic storing and reconstructing method capable of reducing graphic storage capacity and a loading time for a graphic and an apparatus therefor.

2. Description of the Related Art

Graphics represent information through visual effects. A representative example using graphics includes a graphic user interface (GUI) function. The GUI function allows a user to exchange information with a corresponding system through a graphic display. Examples of graphics provided by the GUI function include a setup graphic, a navigation graphic, an edit graphic, etc. As functions performed by the corresponding system increase in variety, providable graphics increase in variety. However, when the variety of providable graphics increases, more storage capacity is necessary.

Conventionally, graphics for the GUI function have been compressed and stored in order to reduce storage capacity of graphics. The graphics for the GUI function generally use a 16 color or a 256 color BMP (Bit MaP) format. A BMP file includes a Color LookUp Table (CLUP) of 4 bytes consisting of A (alpha), R (red), G (green), and B (blue), and an index value of 1 byte for connecting the Look-Up table to respective pixels. Data of a graphic are constructed by indexes of the respective pixels. Therefore, even though the index data is only altered a little upon graphic compression, a difference exists between a source graphic and a reconstructed graphic.

For this reason, to compress data of a graphic for the GUI function, a Huffman coding method with a no loss compression technique has been used, instead of a compression technique with a relatively good compression rate and loss, such as a JPEG or fractal. The no loss compression technique has a relatively low compression rate. Furthermore, since the Huffman coding method assigns a code per a symbol according to the generation probability of the symbol, it is difficult to obtain a high compression rate for a graphic. Therefore, the conventional graphic data processing method is limited in view of a reduced storage capacity.

Also, if the Huffman decoding method is used when reconstructing compressed and stored graphic data, a loading time of the graphic is increased.

SUMMARY OF THE INVENTION

The present invention provides a graphic storing and reconstructing method and apparatus capable of minimizing storage capacity of a graphic for graphic user interface (GUI).

The present invention also provides a graphic storing and reconstructing method and apparatus capable of minimizing a loading time of a graphic for GUI.

According to an aspect of the present invention, there is provided a method for storing a graphic for graphic user interface (GUI), the method comprising: dividing the graphic into sub-graphics on the basis of color characteristic of the graphic; and storing configuration information of the sub-graphics.

According to another aspect of the present invention, there is provided a method for reconstructing a graphic for graphic user interface (GUI) in a system in which divides the graphic into sub-graphics and stores configuration information for the divided sub-graphics, the method comprising: determining sub-graphics required for reconstructing the graphic; reading configuration information of the determined sub-graphics and reconstructing the determined sub-graphics; and combining the reconstructed sub-graphic based on the configuration information and displaying the combined result.

According to another aspect of the present invention, there is provided an apparatus for storing a graphic for graphic user interface (GUI), the apparatus comprising: a graphic divider dividing the graphic into sub-graphics according to a color characteristic of the graphic; a compression unit compressing the sub-graphics divided by the graphic divider; a first storage unit storing data of the sub-graphics compressed by the compression unit; a second storage unit storing configuration information for the sub-graphics divided by the graphic divider; and a system controller, controlling the compression unit and the first storage unit so that if a plurality of sub-graphics with a same graphic color characteristic among the divided sub-graphics exist, data of one sub-graphic among the plurality of sub-graphics is compressed and stored, adding information needed for reading data of the sub-graphics stored in the first storage unit to the configuration information and stores the configuration information in the second storage unit.

According to another aspect of the present invention, there is provided an apparatus for storing a graphic for graphic user interface (GUI), the apparatus comprising: a graphic divider dividing the graphic into sub-graphics according to color characteristic of the graphic; a detector detecting configuration information of the sub-graphics divided by the graphic divider; and a memory storing the configuration information detected by the detector.

According to another aspect of the present invention, there is provided an apparatus for reconstructing a graphic for graphic user interface (GUI) in a system in which includes a graphic divider for dividing the graphic into sub-graphics, a first memory for storing compressed data of the divided sub-graphics, and a second memory for storing configuration information of the divided sub-graphics, the apparatus comprising: a decompression unit decompressing data of sub-graphics read from the first memory; a system controller, if a user requires the reconstruction of a graphic, determining sub-graphics needed for reconstructing the required graphic with reference to the configuration information, and reads data of the sub-graphics from the first memory with reference to configuration information of the determined sub-graphics; and a graphic reconstruction unit, combining the decompressed sub-graphics transmitted from the decompression unit on the basis of the configuration information provided from the system controller, and generates the combined result as a reconstructed graphic.

According to another aspect of the present invention, there is provided an apparatus for reconstructing a graphic for graphic user interface (GUI) in a system in which includes a graphic divider for dividing the graphic into sub-graphics and a memory for storing configuration information of the divided sub-graphics, the apparatus comprising: a system controller, if a user requires the reconstruction of a graphic, determining sub-graphics needed for reconstructing the required graphic with reference to the configuration information, and reads configuration information for the determined sub-graphics from the memory; a graphic data classification unit, if the configuration information is received from the memory, classifying the sub-graphics into a first sub-graphic with gradient characteristic and a second sub-graphic without gradient characteristic on the basis of the configuration information; a graphic generator, if data of the first sub-graphic is received from the graphics data classification unit, reconstructing a sub-graphic using the data of the first sub-graphic; and a graphic reconstruction unit, combining the reconstructed sub-graphic transmitted from the graphic generator and graphic data of the second sub-graphic transmitted from the graphic data classification unit on the basis of the configuration information provided from the system controller, and generating the combined result as a reconstructed graphic.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 7 is a flowchart illustrating a graphic reconstructing method according to an embodiment of the present invention;

FIG. 8 is a flowchart illustrating a graphic storing method according to another embodiment of the present invention; and FIG. 9 is a flowchart illustrating a graphic reconstructing method according to another embodiment of the present invention.

DETAILED DESCRIPTION OF THE PREFERRED EMBODIMENTS

Figure 1:
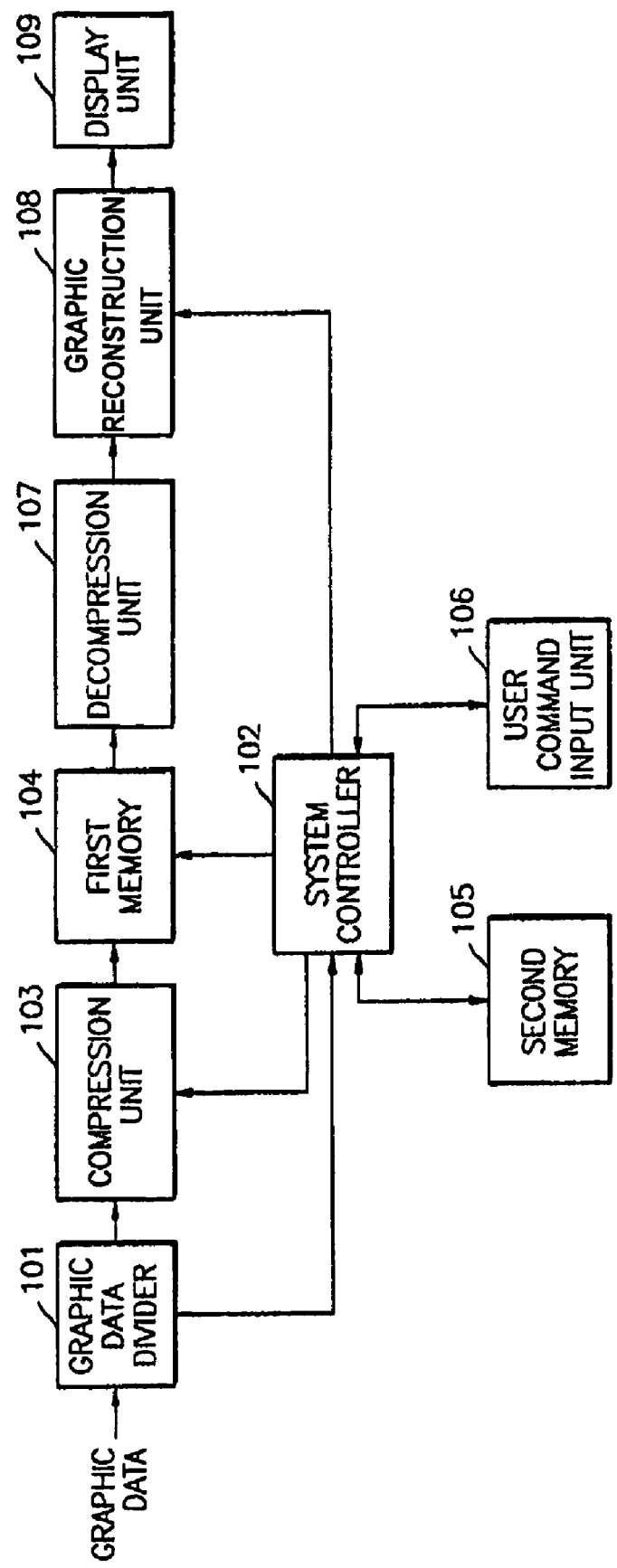
FIG. 1 is a block diagram of a graphic storing and reconstructing apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a graphic storing and reconstructing apparatus according to an embodiment of the present invention. Referring to FIG. 1, the graphic storing and reconstructing apparatus comprises a graphic data divider 101, a system controller 102, a compression unit 103, a first memory 104, a second memory 105, a user command input unit 106, a decompression unit 107, a graphic reconstruction unit 108, and a display unit 109.

If graphic data is input, the graphic data divider 101 divides the graphic data into background graphics and object graphics on the basis of color characteristics of a graphic corresponding to the graphic data. The graphic data can be represented by indexes corresponding respectively to color values of pixels constructing the graphic. If a graphic is shown using 256 colors, 256 indexes exist. The background graphics and the object graphics are sub-graphics of the graphic corresponding to the input graphic data.

Figure 2A:
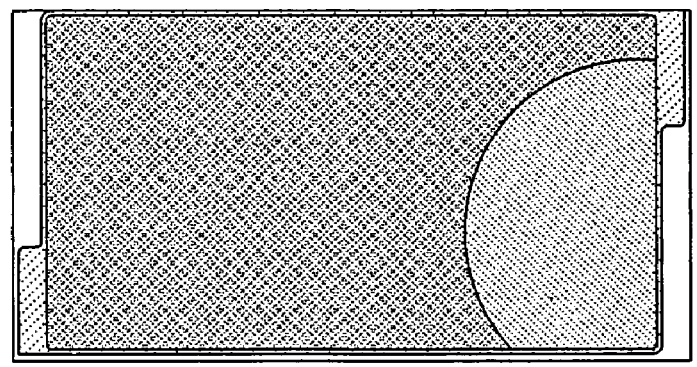
FIGS. 2A through 2C show examples of graphic division and graphic compression according to the embodiment shown in FIG. 1.
Figure 2B:
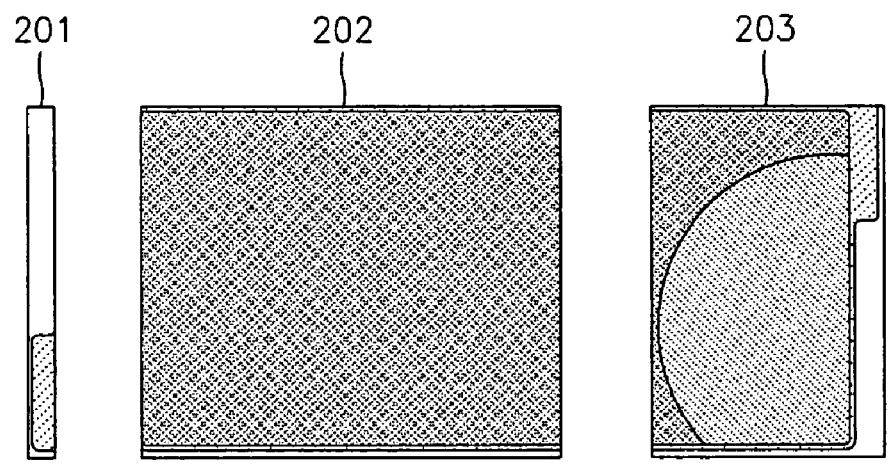

If graphic data corresponding to a graphic as shown in FIG. 2A is input, the graphic data divider 101 can divide the graphic data into data of three sub-graphics as shown in FIG. 2B, wherein areas 201 and 202 are background graphics and are divided as sub-graphics of the graphic corresponding to the graphic data because their color characteristics (or index values) are different from each other. The pixels included in the area 201 have similar color values, and the pixels included in area 202 have similar color values. The area 203 is an object graphic. The area 203 includes pixels with different color values in FIG. 2B and therefore can be divided according to the color values of the pixels.

Figure 3:
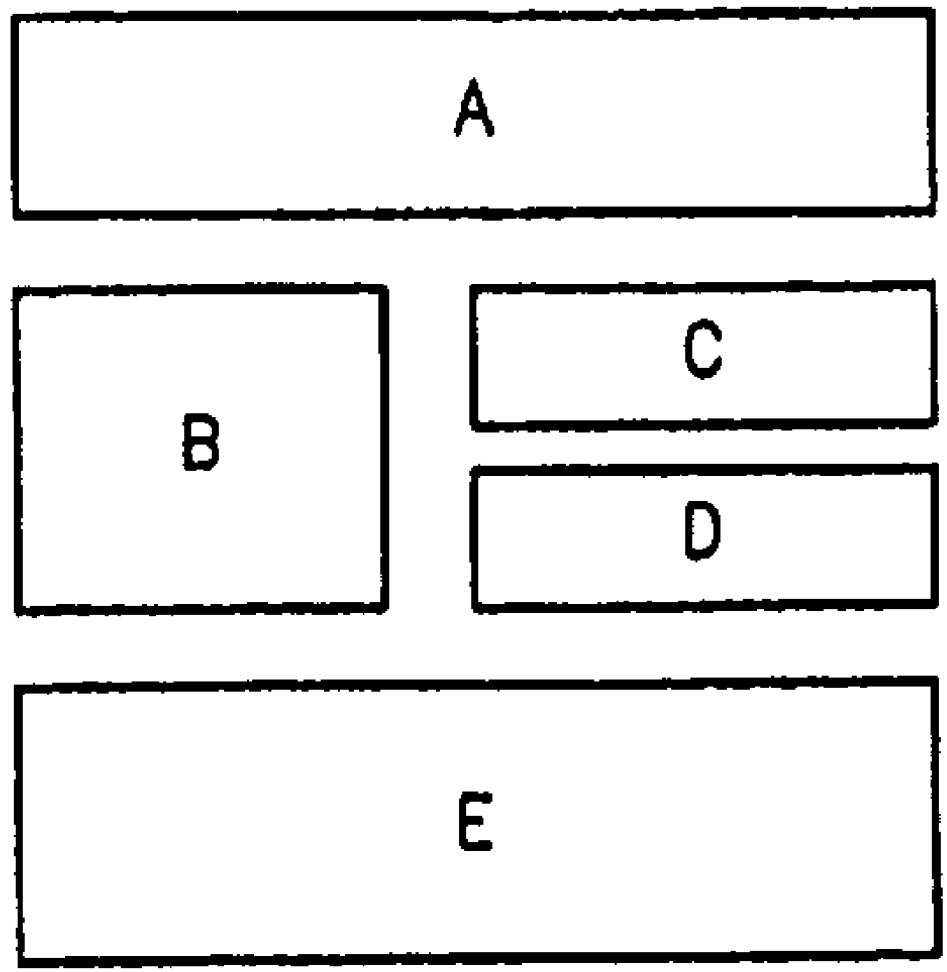
FIG. 3 shows another example of a graphic divided by a graphic data divider of FIG. 1.

Also, the graphic data divider 101 can divide a graphic corresponding to the graphic data into a plurality of sub-graphics according to the color characteristics of the graphic, as shown in FIG. 3. FIG. 3 shows an example that a graphic is divided into one background graphic and five object graphics. Areas A, B, C, D, and E are object graphics. Here, there can be similar color values of pixels constructing the object graphics of areas A and B. The reason in which the areas A and B are divided although the color values of their pixels are similar is because a background graphic exists between area A and area B.

The graphic data divider 101 provides configuration information of the sub-graphics to the system controller 102 while outputting the graphic data of the sub-graphics to the compression unit 103. The configuration information includes indexes corresponding to the color values of the pixels, coordinate data of the sub-graphics, and size data of the sub-graphics.

The compression unit 103 compresses the divided sub-graphics individually by using a Huffman coding method which is a representative no loss compression technique. Effective compression can be expected by the Huffman coding method, which uses the generation probability of an index value, since the sub-graphics comprise pixels with index values that are similar. For example, when the graphic is divided, as shown in FIG. 2B, it is required to compress a representative index of 1 byte since the pixels of the area 202 has one index. The sub graphics compressed individually are controlled by the system controller 102 and are stored individually in the first memory 104.

The system controller 102 determines whether sub-graphics with a similar color characteristic exist on the basis of the indexes of the sub-graphics provided by the graphic data divider 101. That is, it is determined whether sub-graphics with the same index exist among the sub-graphics divided by the graphic data divider 101. If sub-graphics with the same color characteristic exist, the system controller 102 controls the compression unit 103 and the first memory 104 so that only one sub-graphic is compressed and stored.

For example, if the sub-graphic A and the sub-graphic B shown in FIG. 3 have the same color characteristic, the system controller 102 controls the compression unit 103 and the first memory 104 so that an index of the sub-graphic A is compressed and stored in the first memory 103 and an index of the sub-graphic B is neither compressed nor stored. The first memory 104 may be a flash memory.

The system controller 102 stores the coordinate data and size data of all sub-graphics provided by the graphic data divider 101 and required information in order to read the coordinate data and size data of all sub-graphics provided by the graphic data divider 101 and the compressed data stored in the first memory 104 as configuration information for sub-graphic in the second memory 105. As in the above-described example, if the sub-graphics A and B of FIG. 3 are the same color characteristic and accordingly compressed graphic data of the sub-graphic B is not stored in the first memory 104, the system controller 102 stores configuration information capable of creating the sub-graphics A and B shown in FIG. 3 using compressed graphic data of the sub-graphic A stored in the first memory 104, in the second memory 105.

The required information required for reading compressed graphic data stored in the first memory 104 can include identification information of sub-graphics, identification information of a graphic including sub-graphics, and an address of the first memory 104. Therefore, when a graphic required by a user is created, the system controller 102 reads compressed graphic data of a corresponding sub-graphic from the first memory 104 with reference to the configuration information stored in the second memory 105.

The user command input unit 106 may be a button installed in the corresponding system. However, in a graphical user interface (GUI) environment, the user command input unit 106 may be any device to which a user can input a command through a GUI display. For example, the user command input unit 101 may be a mouse.

If a graphic output is required from the user command input unit 106, the system controller 102 reads from the first memory 104 a compressed graphic data corresponding to a sub-graphic required for creating a corresponding graphic, with reference to configuration information stored in the second memory 105.

The compressed sub-graphic data of the sub-graphic read from the first memory 104 is transmitted to the decompression unit 107. The decompression unit 107 decompresses the compressed sub-graphic data the sub-graphic read from the first memory 104.

Figure 2C:
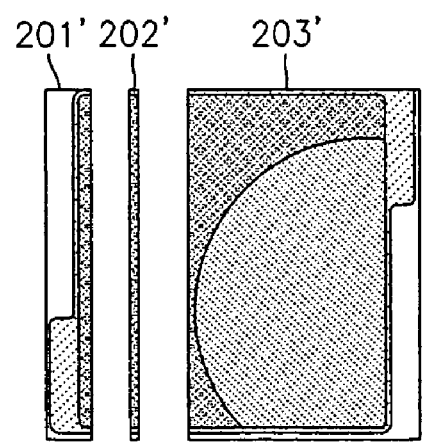

The graphic reconstruction unit 108 combines the decompressed sub-graphics transmitted from the decompression unit 107 according to a control given by the system controller 102. For example, in a case where the decompressed sub-graphics are sub-graphics 201', 202', and 203', as shown in FIG. 2C, the graphic reconstruction unit 108 copies the sub-graphic 202' repeatedly n times, reconstructs the result as a sub-graphic 202 of FIG. 2B, and combines the sub-graphic 201', the reconstructed sub-graphic 202, and the sub-graphic 203' as shown in FIG. 2A, in order to form the original graphic shown in FIG. 2A using the input sub graphics 201', 202', and 203'. Here, the system controller 102 can provide configuration information including coordinate data and size data of the respective sub-graphics to the graphic reconstruction unit 108.

The display unit 109 displays the reconstructed graphic transmitted from the graphic reconstruction unit 108. The display unit 109 includes a graphic engine for displaying a graphic for GUI.

Figure 4:
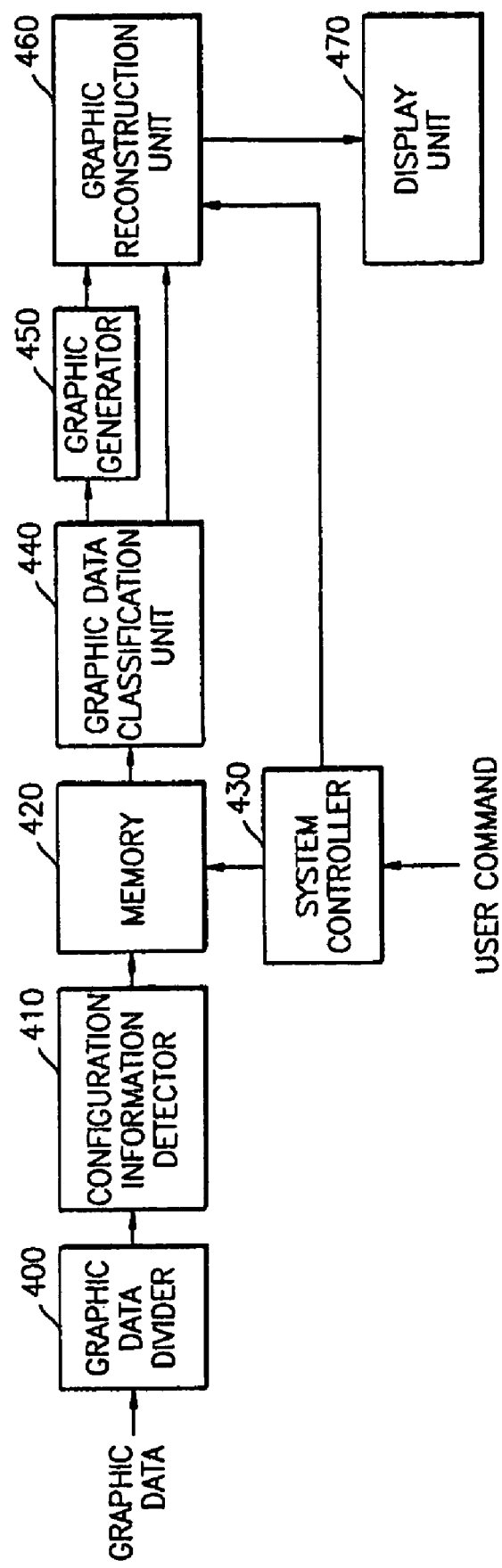
FIG. 4 is a block diagram of a graphic storing and reconstructing apparatus according to another embodiment of the present invention.

FIG. 4 is a block diagram of a graphic storing and reconstructing apparatus according to another embodiment of the present invention. Referring to FIG. 4, the graphic storing and reconstructing apparatus includes a graphic data divider 400, a configuration information detector 410, a memory 420, a system controller 430, a graphic data classification unit 440, a graphic generator 450, a graphic reconstruction unit 460, and a display unit 470.

The graphic data divider 400 divides a graphic corresponding to input graphic data into sub-graphic without gradient characteristic and sub-graphics with gradient characteristic on the basis of the color characteristic of the graphic. The color characteristic of the graphic can be recognized by indexes corresponding to color values of pixels included in the graphic. The sub-graphic without gradient characteristic is a graphic to which a graphic generation algorithm cannot be applied. The sub-graphic with gradient characteristic is a graphic to which the graphic generation algorithm can be applied.

Figure 5A:
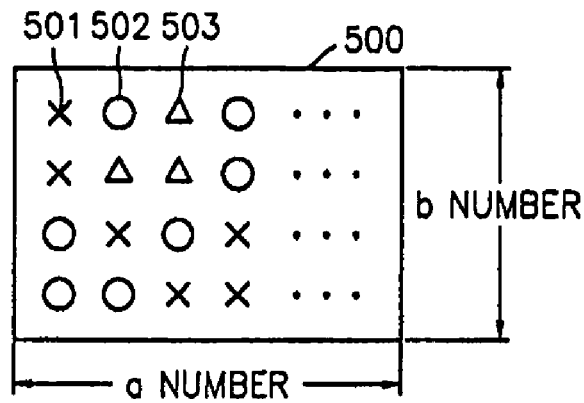
FIGS. 5A through 5C each show examples of graphics divided by a first graphic data divider of FIG. 4.

The sub-graphic without gradient characteristic has an irregular pattern or a random pattern. Accordingly, the sub-graphic without gradient characteristic is a graphic with texture characteristic. A sub-graphic 500 of FIG. 5A is an example of the sub-graphic without gradient characteristic. The sub-graphic of FIG. 5A has a format in which indexes 501, 502, and 503 are scattered within a pixel size of a×b.

The sub-graphic with gradient characteristic has a regular pattern. That is, the sub-graphic with gradient characteristic is a graphic in which unit graphic is repeatedly formed in a predetermined direction from a predetermined location on a graphic. A sub-graphic 510 of FIG. 5B is an example of the sub-graphic with gradient characteristic.

Figure 5B:
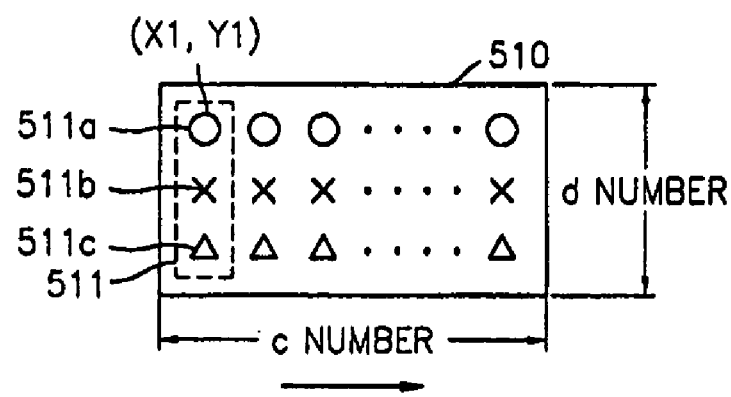

As seen in FIG. 5B, the sub-graphic 510 with gradient characteristic has a pattern in which unit graphic 511 is repeated. That is, the sub-graphic 510 of FIG. 5B has a pattern in which unit graphic 511 is repeatedly formed in a horizontal direction (arrow direction) from a location (x1, y1) on the sub-graphic. Since the sub-graphic 510 has a pixel size of c×d, the unit graphic 511 is repeated c times as the number of pixels and a start location of a repeated pattern is a coordinate (x1, y1). The unit graphic 511 comprises indexes 511a, 511b, and 511c provided to the respective first pixels of respective rows. The indexes 511a, 511b, and 511c represents color values of their corresponding pixels.

The unit graphic 511 of FIG. 5B has a matrix of 1×d, however can have a matrix of c×1 according to indexes of pixels constructing the sub-graphic. The start coordinate and repeated direction of the unit graphic can be different from the above-described example.

Figure 5C:
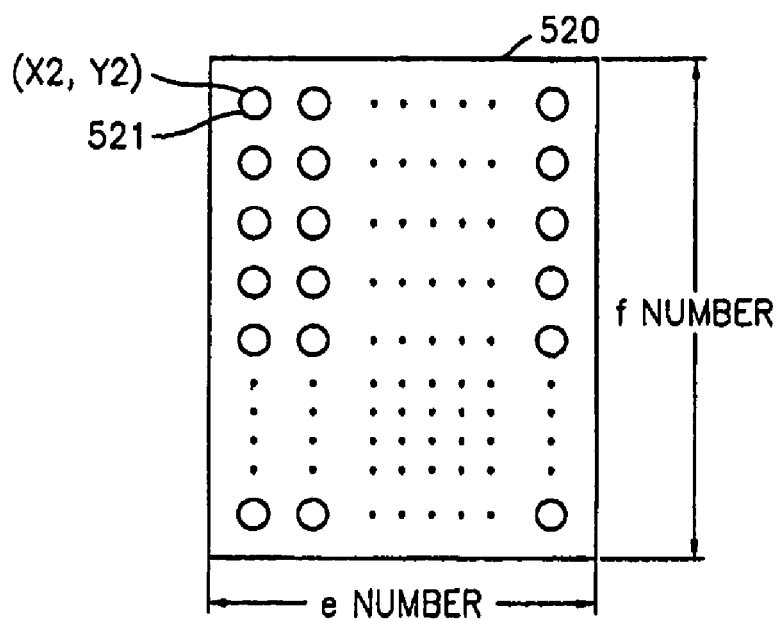

The sub-graphic 520 of FIG. 5C is an example of a sub-graphic with gradient characteristic wherein each pixel is an index 521. Here, a start location of the sub-graphic 520 is a coordinate (x2, y2).

The above-described sub-graphic with gradient characteristic may be an object graphic or a background graphic of a graphic corresponding to input graphic data. The sub-graphic without gradient characteristic may be an object graphic or a background graphic of the graphic.

If sub-graphics divided by the graphic data divider 400 are received, the configuration information detector 410 divides the received sub-graphics into sub-graphics with gradient characteristic and sub-graphics without gradient characteristic and detects configuration information of each of the sub-graphics. The configuration information includes indexes of pixels included in the sub-graphics, coordinate data of the sub-graphics, and size data of the sub-graphics.

In a case of the sub-graphic without gradient characteristic, the configuration information detector 410 detects as configuration information all indexes included in the sub-graphic, coordinate data and size data of the sub-graphic, and identification information of a corresponding graphic. In a case of the sub-graphic with gradient characteristic, the configuration information detector 410 detects as configuration information a representative index included in the sub-graphic or an index of a pixel included in a unit graphic, coordinate data and size data of the sub-graphic, and identification information of a corresponding graphic.

The coordinate data included in the configuration information of the sub-graphic with gradient characteristic further includes coordinate data indicating a start location of the unit graphic. The size data includes a value indicating the width and height of the sub-graphic. The configuration information can include information for the number of total pixels per a sub-graphic. The configuration information detector 410 stores configuration information detected per each sub-graphic in the memory 420.

The memory 420 stores the configuration information including indexes of pixels included in each sub-graphic, coordinate data and size data of each sub-graphic, and identification information of a corresponding graphic.

If a user requires the generation of a graphic though a user command, the system controller 430 determines which sub-graphics are to be included in the required graphic based on the identification information of the graphic stored in the memory 420, reads configuration information of the determined sub-graphics from the memory 420, and transmits the read configuration information from the memory 420 to the graphic data classification unit 440.

The graphic data classification unit 440 classifies the sub-graphics into sub-graphics to which a graphic generation algorithm is applied and sub-graphics to which the graphic generation algorithm is not applied, on the basis of the configuration information transmitted from the memory 420. The graphic data classification unit 440 transmits configuration information of the sub-graphics to which the graphic generation algorithm is applied, to the graphic generator 450, and transmits data (indexes) of the sub-graphics to which the graphic generation algorithm is not applied, to the graphic reconstruction unit 460.

The graphic generator 450 reconstructs a sub-graphic using the configuration information of the input sub-graphic. That is, if the graphic generator 450 receives configuration information including a representative index, the number of total pixels, and size data of a sub-graphic, the graphic generator 450 forms a sub-graphic having all pixels with the representative index and which has the size data and includes pixels corresponding to the number of total pixels, using the configuration information, and generates the formed sub-graphic as the reconstructed sub-graphic. Also, if the graphic generator 450 receives configuration information including an index of a unit graphic, a start location of a unit graphic, size data of a sub-graphic, and the number of total pixels included in a sub-graphic, the graphic generator 450 copies the unit graphic using the configuration information to form a sub-graphic with the size and generates the formed sub-graphic as the reconstructed sub-graphic. The graphic generator 450 transmits the generated sub-graphic to the graphic reconstruction unit 460.

The graphic reconstruction unit 460 combines data of the sub-graphics transmitted respectively from the graphic generator 450 and the graphic data classification unit 440 with reference to the configuration information for sub-graphic provided by the system controller 430, thereby generating a reconstructed graphic, as in the graphic reconstruction unit 108 of FIG. 1.

The display unit 470 includes a graphic engine and displays the graphic reconstructed by the graphic reconstruction unit 460, as in the display unit 109 of FIG. 1.

As such, according to the graphic storing and reconstructing apparatus of FIG. 4, it is possible to reduce a graphic data loading time since the graphic generation algorithm is applied to only the sub-graphics with gradient characteristic to generate a graphic.

Figure 6:
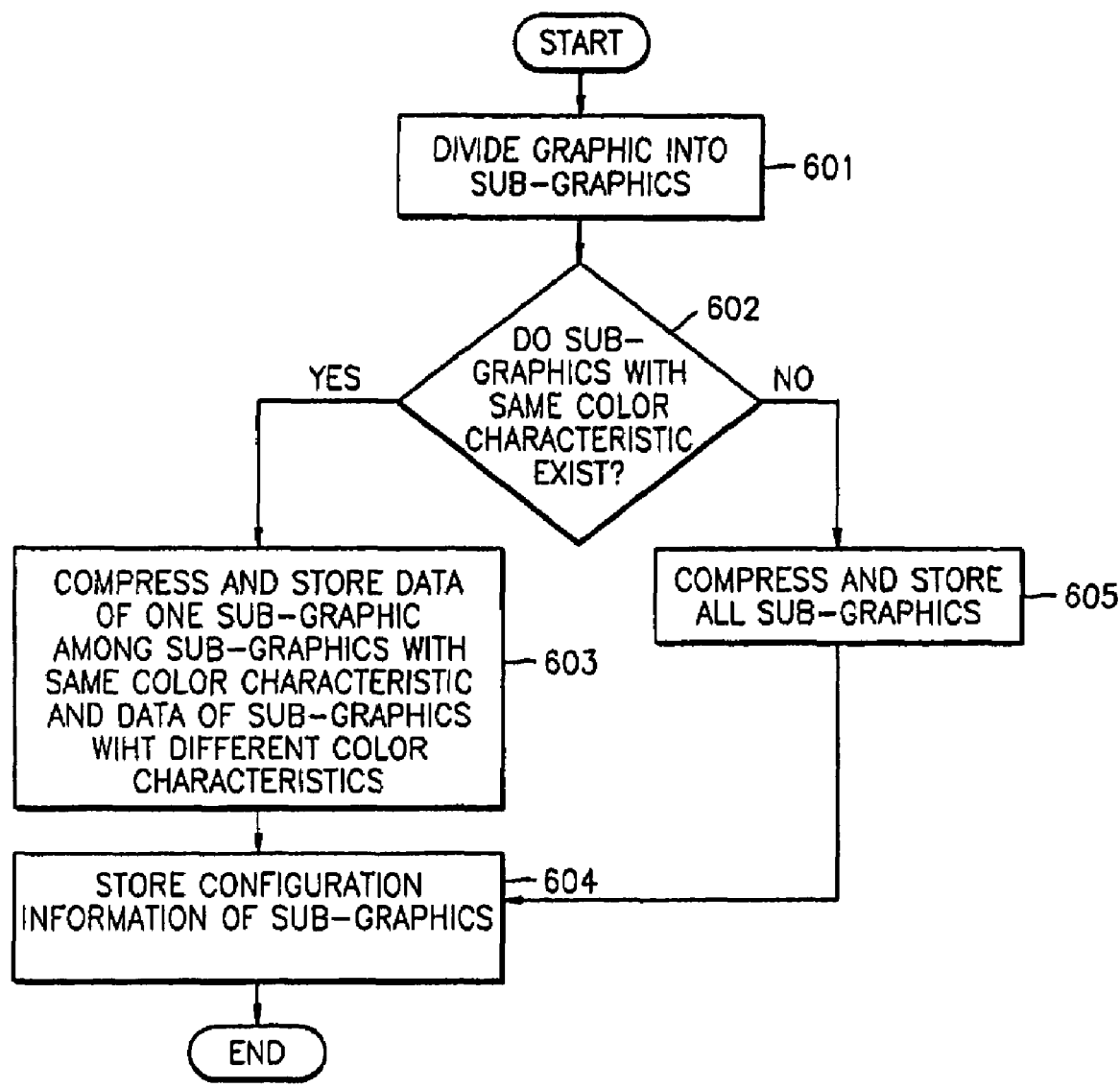
FIG. 6 is a flowchart illustrating a graphic storing method according to an embodiment of the present invention.

FIG. 6 is a flowchart illustrating a graphic storing method according to an aspect of the present invention.

If a system receives graphic data, the system divides a graphic corresponding to the graphic data into sub-graphics according to color characteristic of the graphic in operation 601. The system includes the graphic storing and reconstructing apparatus shown in FIG. 1. A method used for dividing the graphic to the sub-graphics is described above with reference to the graphic division unit 101 of FIG. 1. The graphic data can be represented by indexes indicating color characteristic of pixels.

In operation 602, the system determines whether sub-graphics with the same color characteristic exist among the divided sub-graphics. That is, in operation 602, the system determines whether sub-graphics with the same index exist among the divided sub-graphics.

If it is determined on operation 602 that sub-graphics with the same color characteristic exist, the system compresses and stores graphic data of a sub-graphic among the sub-graphics with the same color characteristic using a Huffman coding method in operation 603. Graphic data of the remaining sub-graphics with the same color characteristic is neither compressed nor stored. Also, the system compresses and stores all data of sub-graphics with different color characteristics among the divided sub-graphics using the Huffman coding method.

In operation 604, the system stores configuration information of all the divided sub-graphics. The configuration information includes coordinate data of sub-graphics, size data of sub-graphics, and information needed for reading compressed and stored sub-graphics. The information needed for reading the sub-graphics can include identification information of the graphic corresponding to the sub-graphics and an address of a memory storing the corresponding graphic data.

However, if it is determined in operation 602 that no sub-graphics with the same color characteristic exist, the system compresses and stores graphic data of all the sub-graphics using the Huffman coding method in operation 605 and stores configuration information of all the sub-graphics in operation 604.

FIG. 7 is a flowchart illustrating a graphic reconstructing method according to an embodiment of the present invention.

If a user requires the generation of a graphic, a system determines sub-graphics corresponding to the graphic among the compressed and stored sub-graphic data with reference to the configuration information of the sub-graphics stored in operation 604 of FIG. 6 and reads compressed data of the determined sub-graphics, in operation 701.

In operation 702, the system decompresses the compressed data of the sub-graphics using the Huffman coding method.

In operation 703, the system combines the decompressed data of the sub-graphics with reference to the configuration information and generates the combined result as a reconstructed graphic. For example, as shown in FIG. 2C, the system combines a result obtained by repeatedly copying the area 202' n times and the areas 201' and 203' and generates the combined result as a reconstructed graphic.

Then, the graphic generated on operation 704 is displayed.

FIG. 8 is a flowchart illustrating a graphic storing method according to another embodiment of the present invention.

If graphic data is received, a system divides a graphic corresponding to the graphic data into sub-graphics according to color characteristic of the graphic in operation 801. That is, the system divides the graphic into sub-graphics with gradient characteristic and sub-graphics without gradient characteristic as described above with reference to FIG. 4, according to the color characteristic of the graphic. The graphic data can be represented by indexes indicating color values of pixels. The system includes the graphic storing and reconstructing apparatus of FIG. 4.

In operation 802, the system detects configuration information of each of the sub-graphics. In a case of the sub-graphic with gradient characteristic, the system detects, as the configuration information, coordinate data of the sub-graphic, size data of the sub-graphic, and a representative index of the sub-graphic. If the sub-graphic with gradient characteristic includes a unit graphic comprising a plurality of representative indexes, the system further detects as configuration information a start location (coordinate data) of the unit graphic. In a case of the sub-graphic without gradient characteristic, the system detects as configuration information coordinate data of the sub-graphic, size data of the sub-graphic, and all indexes of pixels included in the sub-graphic. The configuration information can further include the number of total pixels included in the sub-graphic. The size data can be represented by the width and height of the sub-graphic.

In operation 803, the system stores the configuration information detected per a sub-graphic.

FIG. 9 is a flowchart illustrating a graphic reconstructing method according to another embodiment of the present invention.

If a user requires the generation of a graphic, the system determines sub-graphics corresponding to the graphic required by the user and reads configuration information of the determined sub-graphics in operation 901. The configuration information includes indexes of pixels constructing the sub-graphics, size data of the sub-graphics, and coordinate data of the sub-graphics. If the sub-graphic includes information for the indexes of the pixels as unit graphic information, the coordinate data can include information for a location at which the unit graphic can be first repeated. The size data includes the width and height of the sub-graphic.

In operation 902, the system divides the read sub-graphics into sub-graphics with gradient characteristic and sub-graphics without gradient characteristic. In operation 903, in the case of the sub-graphic with gradient characteristic, the system reconstructs a corresponding sub-graphic using configuration information as in the graphic generator 450 of FIG. 4. In the case of the sub-graphic without gradient characteristic, the system loads all data (indexes) of the read sub-graphics without using the graphic generator 450 of FIG. 4.

In operation 904, the system combines the sub-graphic data reconstructed and loaded in operation 903 on the basis of the configuration information of the graphic and generates the combined result as a reconstructed graphic. The configuration information of the graphic has been obtained in operation 901.

In operation 905, the reconstructed graphic data is displayed in a graphic format required by the user.

As described above, according to the present invention, by dividing a graphic into sub-graphics according to color characteristics of the graphic, compressing and storing the sub-graphics individually, decompressing the sub-graphics individually, and combining the decompressed sub-graphics to thereby reconstruct an original graphic, it is possible to improve a graphic compression efficiency.

Also, if a plurality of sub-graphics with the same color characteristic among the divided sub-graphics exist, only one sub-graphic among the plurality of sub-graphics is compressed and stored, which reduces the amount of storage required for graphics.

Also, by dividing sub-graphics into sub-graphics with gradient characteristic and sub-graphics without gradient characteristic, storing configuration information of the sub-graphics, and reconstructing a graphic using the stored configuration information, it is possible to reduce a storage amount of a graphic and reduce a loading time of a graphic.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for storing a graphic for a graphic user interface, the method comprising:
    dividing the graphic into sub-graphics based on a color characteristic of the graphic; and
    storing configuration information of the sub-graphics,
    wherein each of the sub-graphics is one among a sub-graphic with a gradient characteristic and a sub-graphic without a gradient characteristic.

2. The method of claim 1, wherein if one of the sub-graphics is the sub-graphic with the gradient characteristic, the configuration information includes a representative index of pixels included in the one sub-graphic, coordinate data of the one sub-graphic, size data of the one sub-graphic, and identification information of a corresponding graphic,
    if the one sub-graphic is the sub-graphic without the gradient characteristic, the configuration information includes all indexes of pixels included in the one sub-graphic, coordinate data of the one sub-graphic, size data of the one sub-graphic, and identification information of a corresponding graphic.

3. The method of claim 2, further comprising:
    compressing and storing data of the sub-graphics.

4. The method of claim 3, wherein if a plurality of sub-graphics with a same color characteristic among the sub-graphics exist, data of one sub-graphic among the plurality of sub-graphics is compressed and stored.

5. The method of claim 4, wherein the configuration information includes coordinate data of the sub-graphics, size data of the sub-graphics, and information needed for reading the compressed data of the sub-graphics.

6. The method of claim 3, wherein the data of sub-graphics are compressed using a Huffman coding method.

7. The method of claim 2, wherein each of the sub-graphics is one among a background graphic and an object graphic of the graphic.

8. The method of claim 2, wherein if a unit graphic including a plurality of representative indexes is detected in the one sub-graphic with the gradient characteristic, the configuration information further includes information indicating a start location of the unit-graphic in the one sub-graphic.

9. A method of reconstructing a graphic for a graphic user interface in a system that divides the graphic into sub-graphics and stores configuration information for the divided sub-graphics, the method comprising:

determining the sub-graphics required for reconstructing the graphic;

reading configuration information of the determined sub-graphics and reconstructing the determined sub-graphics; and combining the reconstructed sub-graphic based on the configuration information and displaying the combined result, wherein if the data of sub-graphics is included in the configuration information, then reconstructing the determined sub-graphics comprises dividing the sub-graphics into a first sub-graphic with a gradient characteristic and a second sub-graphic without a gradient characteristic on the basis of the configuration information;

reconstructing the first sub-graphic using a graphic generation algorithm; and generating data of the second sub-graphic as a reconstructed sub-graphic.

10. The method of claim 9, wherein if the data of sub-graphic is not included in the configuration information, then the reconstructing the determined sub-graphics comprises:

reading compressed data of the sub-graphics based on the configuration information; and decompressing the compressed data of the sub-graphics and generating the decompressed result as a reconstructed sub-graphic.

11. The method of claim 10, wherein the data of the sub-graphics is an index corresponding to a color value of a pixel.

12. The method of claim 9, wherein the configuration information is indexed corresponding to color values of pixels included in the sub-graphics.

13. The method of claim 12, wherein if the first sub-graphic has one index, the graphic generation algorithm generates as a reconstructed sub-graphic of the first sub-graphic a sub-graphic such that all pixels have the index, and if the first sub-graphic has a unit graphic consisting of a plurality of indexes, the graphic generation algorithm copies the unit graphic in a predetermined direction from a start location of the unit graphic and when a sub-graphic reaching a size of the first sub-graphic is formed, generates the formed sub-graphic as a reconstructed sub-graphic.

14. An apparatus for reconstructing a graphic for a graphic user interface in a system including a graphic divider for dividing the graphic into sub-graphics and a memory for storing configuration information of the divided sub-graphics, the apparatus comprising:

a system controller determining one or more determining the sub-graphics needed for reconstructing the required graphic with reference to the configuration information and reading configuration information for the determined sub-graphics from the memory if a user requires the reconstruction of a graphic;

a graphic data classification unit classifying the sub-graphics into a first sub-graphic with gradient characteristic and a second sub-graphic without gradient characteristic on the basis of the configuration information if the configuration information is received from the memory;

a graphic generator, if data of the first sub-graphic is received from the graphics data classification unit, reconstructing the sub-graphics using the data of the first sub-graphic; and a graphic reconstruction unit combining the reconstructed sub-graphics transmitted from the graphic generator and graphic data of the second sub-graphic transmitted from the graphic data classification unit on the basis of the configuration information provided from the system controller and generating the combined result as a reconstructed graphic.

15. A method of storing and reconstructing a graphic for a graphic user interface in a system, the method comprising:

dividing graphic data into sub-graphics having similar color characteristics;

storing configuration information of each of the sub-graphics;

reading the configuration information of each of the sub-graphics required for generating the graphic corresponding to a user request and reconstructing each of the sub-graphics required for generating the graphic; and combining each of the reconstructed sub-graphics based on the configuration information and displaying the combined result as a reconstructed graphics, wherein the dividing the graphic data comprises dividing the graphic into sub-graphics according to a color characteristic of the graphic, wherein the graphic is divided into sub-graphics with gradient characteristics and sub-graphics without gradient characteristics.

16. The method of claim 15, wherein dividing the graphic data into sub-graphics comprises dividing the graphic data into sub-graphics according to color characteristic of the graphic.

17. The method of claim 16, wherein the dividing graphical data into sub-graphics further comprises dividing the graphic data into at least one background graphic and at least one object graphic.

18. The method of claim 17, wherein each of the at least one background graphic includes pixels with similar color values.

19. The method of claim 18, further comprising compressing graphic data of each of the sub-graphics.

20. The method of claim 19, further comprising decompressing the compressed graphic data after reading the compressed data of the sub-graphics based on the configuration information.

21. The method of claim 19, further comprising using a Huffman coding method for compressing and decompressing graphic data of each of the sub-graphics, wherein the sub-graphics are composed of pixels having similar index values.

22. The method of claim 21, further comprising determining whether the sub-graphics with a similar index value exist among the divided sub-graphics, wherein if the sub-graphics with the similar index values exist among the divided sub-graphics, compressing and storing the graphic data of a single sub-graphic among the sub-graphics with the similar index values and compressing and storing the graphic data of each of the sub-graphics with different index values; and if the sub-graphics with similar index values do not exist among the divided sub-graphics, compressing and storing the graphic data of all of the sub-graphics.

23. The method of claim 22, wherein configuration information for compressing the sub-graphics includes at least one of coordinate data of each of the sub-graphics, size data of each of the sub-graphics, and information needed for reading the compressed data of each of the sub-graphics.

24. The method of claim 23, wherein when the graphic is required by a user command, compressed graphic data of each of the corresponding sub-graphics is read with reference to the configuration information of each of the corresponding sub-graphics.

25. The method of claim 24, wherein displaying the combined result as a reconstructed graphic further comprises combining the decompressed data of each of the sub-graphics with reference to the configuration information.

26. The method of claim 25, wherein repeatedly copying each of the decompressed sub-graphics to form a reconstructed sub-graphic and combining the reconstructed sub-graphic with at least one corresponding sub-graphic to form an original graphic.

27. The method of claim 15, further comprising recognizing the color characteristic of the graphic by indexes corresponding to color values of pixels included in the graphic.

28. The method of claim 27, further comprising detecting configuration information of each of the sub-graphics, wherein configuration information of the sub-graphic with gradient characteristics comprises detecting at least one of coordinate data of each of the sub-graphics, size data of each of the sub-graphics, and a representative index of each of the sub-graphics, and configuration information of the sub-graphic without gradient characteristics, comprises detecting at least one of coordinate data of each of the sub-graphics, size data of each of the sub-graphics, and all indexes of pixels included in each of the sub-graphics.

29. The method of claim 28, wherein if the sub-graphic with gradient characteristics includes a unit graphic comprising a plurality of representative indexes, the configuration information further comprises coordinate data of the unit graphic at which the unit graphic is first repeated.

30. The method of claim 29, wherein the storing of configuration information includes storing the configuration information detected for each of the sub-graphics.

31. The method of claim 29, wherein upon receiving the user request requiring generation of the graphic, determining the sub-graphics corresponding to the graphic required by the user and reading configuration information of the determined sub-graphics.

32. The method of claim 31, further comprising dividing the read sub-graphics into sub-graphics with gradient characteristics and sub-graphics without gradient characteristics.

33. The method of claim 32, wherein each of the sub-graphics with gradient characteristic is a graphic in which unit graphic is repeatedly formed in a predetermined direction from a predetermined location on the graphic and each of the sub-graphic without gradient characteristic is a graphic in which unit graphic is formed in an irregular pattern on the graphic.

34. The method of claim 33, further comprising reconstructing a corresponding sub-graphic using configuration information for sub-graphics with gradient characteristics and all data of the read sub-graphics for sub-graphics without gradient characteristics.

35. The method of claim 34, further comprising applying a graphic generation algorithm to only the sub-graphics with gradient characteristics when generating the graphic in order to reduce a graphic loading time.

36. The method of claim 18, comprising decompressing the compressing sub-graphics according to a control, wherein the control provides configuration information including coordinate data and size data of sub-graphics for graphic reconstruction.

37. A method of storing and reconstructing a graphic for a graphic user interface in a system, the method comprising:
dividing graphic data into sub-graphics having similar color characteristics;
storing configuration information of each of the sub-graphics;
reading the configuration information of each of the sub-graphics required for generating the graphic corresponding to a user request and reconstructing each of the sub-graphics required for generating the graphic; and
combining each of the reconstructed sub-graphics based on the configuration information and displaying the combined result as a reconstructed graphic,
wherein when the user requests the generation of the graphic, determining which sub-graphics to be included in the required graphic based on the identification information of the graphic stored, reading configuration information of the determined sub-graphics, and transmitting the read configuration information to the graphic data classification unit, wherein the sub-graphics are classified into sub-graphics to which a graphic generation algorithm is applied and sub-graphics to which the graphic generation algorithm is not applied, on the basis of the transmitted configuration information.

38. A method of storing and reconstructing a graphic for a graphic user interface in a system, the method comprising:
dividing graphic data into sub-graphics having similar color characteristics;
storing configuration information of each of the sub-graphics;
reading the configuration information of each of the sub-graphics required for generating the graphic corresponding to a user request and reconstructing each of the sub-graphics required for generating the graphic; and
combining each of the reconstructed sub-graphics based on the configuration information and displaying the combined result as a reconstructed graphic,
wherein the configuration information for reading the sub-graphics includes at least one of identification information of the graphic corresponding to the sub-graphics and an address of a memory storing the corresponding graphic data.

39. An apparatus for storing and reconstructing a graphic for a graphic user interface, the apparatus comprising:
a graphic divider to divide graphic data into sub-graphics having similar color characteristics;
a compression unit to compress the graphic data of each of the sub-graphics divided by the graphic divider;
a plurality of storage units to store the compressed graphic data and configuration information for the sub-graphics divided by the graphic divider
a system controller to control the compression unit and the plurality of storage units, read configuration information of the compressed graphic data of each of the sub-graphics, and determine which sub-graphics are required for reconstructing the required graphic with reference to the configuration information;
a decompression unit to decompress data of each of the sub-graphics required for generating the graphic corresponding to a user request; and
a graphic reconstruction unit to combine each of the decompressed sub-graphics transmitted from the decompression unit on the basis of the configuration information provided from the system controller, and generate the combined result as a reconstructed graphic displayed on a display unit,
wherein the system controller controls the compression unit and a first storage unit so that if sub-graphics with a same graphic color characteristic among the divided sub-graphics exist, data of only one sub-graphic among the sub-graphics is compressed and stored, and adds information needed for reading data of the sub-graphics stored in the first storage unit to the configuration information and stores the configuration information in a second storage unit.

40. The apparatus of claim 39, wherein the graphic data provider provides configuration information of the sub-graphics to the system controller while outputting the graphic data of the sub-graphics to the compression unit.

41. The apparatus of claim 39, further comprising a user command input unit to enable a user to input a command through the graphic user interface.

42. The apparatus of claim 39, wherein the configuration information includes indexes of pixels in each of the sub-graphics.

43. The apparatus of claim 39, wherein the display unit includes a graphic engine displaying a graphic for the graphic user interface.

44. An apparatus for storing and reconstructing a graphic for a graphic user interface, wherein the apparatus includes a memory unit storing configuration information, and comprises:
- a graphic data divider to divide graphic data into sub-graphics having similar color characteristics;
- a detector to detect configuration information of the sub-graphics divided by the graphic divider;
- a system controller to determine which of the sub-graphics are required sub-graphics for reconstructing the graphic with reference to the configuration information and reading configuration information for each of the determined sub-graphics from the memory unit;
- a graphic data classification unit to classify each of the sub-graphics on the basis of configuration information; and
- a graphic reconstruction unit, connected to the graphic data classification unit, to generate a reconstructed graphic displayed on a display unit, wherein the graphic data classifier classifies each of the sub-graphics into a first sub-graphic with a gradient characteristic and a second sub-graphic without a gradient characteristic on the basis of the configuration information.

45. The apparatus of claim 44, further comprising a graphic generator to reconstruct sub-graphics using data of the sub-graphics received from the graphics data classification unit.

46. The apparatus of claim 45, wherein the graphic reconstruction unit combines the reconstructed sub-graphics transmitted from the graphic generator and graphic data of the sub-graphics transmitted from the graphic data classification unit on the basis of the configuration information provided from the system controller, and generating the combined result as the reconstructed graphic.

47. The apparatus of claim 46, wherein the display unit comprises a graphic engine to display the graphic for the graphic user interface.

* * * * *

UNITED STATES PATENT AND TRADEMARK OFFICE
CERTIFICATE OF CORRECTION

| | | |
|---|---|---|
| PATENT NO. | : 7,463,768 B2 | Page 1 of 1 |
| APPLICATION NO. | : 10/781658 | |
| DATED | : December 9, 2008 | |
| INVENTOR(S) | : Young-seuk Oh | |

It is certified that error appears in the above-identified patent and that said Letters Patent is hereby corrected as shown below:

Column 1, Lines 9-10, change "Applications" to --Application--.

Column 12, Line 24, change "graphics," to --graphic,--

Signed and Sealed this

Twenty-fourth Day of March, 2009

JOHN DOLL
*Acting Director of the United States Patent and Trademark Office*